United States Patent Office 2,801,512
Patented Aug. 6, 1957

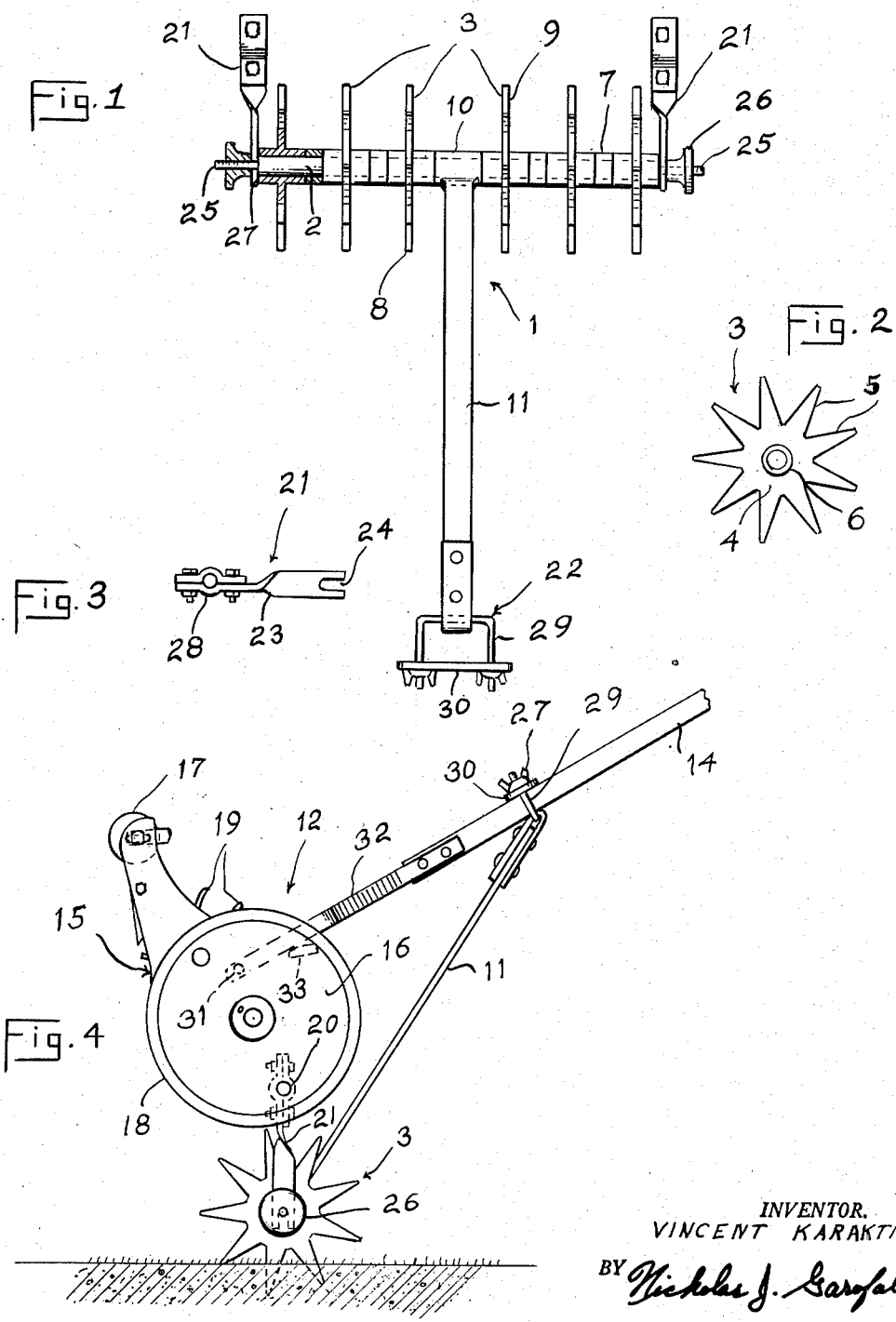

2,801,512

SOIL CONDITIONING DEVICE FOR LAWN MOWER

Vincent Karaktin, New Hyde Park, N. Y.

Application July 20, 1955, Serial No. 523,153

4 Claims. (Cl. 56—249)

This invention relates to devices for conditioning the soil bed of lawns. Vigorous growth is essential to obtaining a rich green and heavy carpet-like lawn. Not only is proper soil required, but such must be maintained in a loose and porous condition. This permits air and water to get down to the roots of the grass and allows the roots freedom to grow and take nourishment from the soil.

Now, I have devised a rotary device for conditioning the bed soil of a lawn so as to make it loose and porous to enable proper feeding and growth of the grass. The rotary device of my invention comprises a plurality of pronged disc elements which, when rolled across a lawn, are caused to penetrate the soil bed and to condition the same for proper growth of the lawn. Not only does the device serve to condition the lawn for proper growth, but it also conditions the soil for seeding. In the latter respect, seeds scattered over the lawn find their way into the porous soil and there readily take root, absorb moisture, and grow forth.

A feature of the invention is that it is attachable to a conventional lawn mower, and it is attachable in such manner that it does not interfere with the normal use of the lawn mower.

A further feature of the invention is that use is made of the weight of the lawn mower in effecting penetration of the pronged elements of the rotary device into the bed soil.

A still further feature of the invention is means for adjusting the position of the device on the lawn mower so as to provide various desired weights upon the device to effect penetration of the bed soil. By this means the device can be adjusted according to the hardness of the soil bed and so as to obtain the weight load required to effect penetration thereof.

A general object of the invention is, therefore, to provide a simple and practical rotary device attachable to a conventional lawn mower for use in conditioning the soil beds of laws and the like.

The invention further lies in its particular construction and combinations, as well as in the cooperative association of the parts thereof to effect the purposes intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a plan view of a device embodying the invention with some parts cut away;

Fig. 2 is a detail of one of the pronged discs;

Fig. 3 is a detail of one of the attaching brackets; and

Fig. 4 is a view illustrating the device in use combined with a conventional lawn mower.

In describing the invention in further detail, reference is now directed to the drawings wherein there is shown in a device 1 embodying the invention an elongated solid cylindrical shaft or axle 2 on which are mounted for rotation a plurality of pronged discs 3. Each disc comprises a flat faced body 4, the outer edge of which is notched out to form a plurality of radially projecting prongs 5 spaced equally apart from one another around the disc. Extending axially from opposite faces of the body portion 4 are hub pieces 6. The body portions of the discs are spaced from one another on the shaft by the hub pieces as well as by spacers 7 interposed on the shaft between the hub pieces of adjacent discs.

The two central discs 8, 9, are spaced from one another by an eye piece 10 formed crosswise of the end of an elongated bar 11. The latter is pivotable at its eye piece end 10 about shaft 2.

The several discs 3, spacers 7, and the eye piece 10 of the bar 11 are assembled onto shaft 2 by simply sliding the latter through the axial opening in each element. The same may obviously be disassembled for repairs, replacements or otherwise, by simply sliding the several elements off the shaft.

The device 1 employing the invention is for use in combination with or association with a conventional manual push-type lawn mower, as shown at 12 in Fig. 4. The latter includes a conventional push handle 14 and a cutting head 15. The cutting head has the usual end frames 16 which support the usual roller 17, wheels 18, and the rotary blades 19. The end frames are held in spaced relation to one another by the customary tie rod 20 extended across the upper portions thereof.

The device 1 is associated with the lawn mower by a pair of brackets 21 and by means of a clamp 22.

Bracket 21 comprises an elongated flat bar 23, twisted about midway so that one end thereof is disposed on its narrow side vertically, and the opposite end is horizontally disposed. The vertically disposed end of the bar is forked, as at 24, in its end.

At opposite ends of the shaft is formed a reduced extension 25 which is adapted to accommodate a forked end 24 of a bracket 21. Knobs 26, threaded onto the shaft ends 25, serve to hold the assembled members together as a unit on the shaft. Tightening the knobs limits the forked elements against the shoulders 27 on the shaft and thereby secures the position of the brackets 21. It is to be noted, that when the knobs are fully tightened on the shaft, rotation of the disc members is not interfered with, inasmuch as the discs, when fully assembled upon the shaft, do not quite touch the end faces of the forked members 24.

The opposite and horizontally disposed ends of the brackets provide clamps 28 which are adapted to clamp fast about opposite ends of the tie rod 20.

The elongated bar 11 is assembled to a position above the handle of the lawn mower and is attachable to the latter by a U bolt 29.

The bridge of the latter is pivotable in a hole provided crosswise of the end of the bar. The arms of the bolt are formed to accommodate the squared body of the lawn mower handle. A clamping bar 30, slidable over the arms of the U bolt against the surface of the handle, when tightened by wing nuts 27 serves to secure this end of the elongated bar 11 fast to the handle of the lawn mower.

The brackets 21 are of sufficient length, so that when the device is assembled to the lawn mower it will be raised above the cutting blades of the latter so as not to interfere with any cutting operations of the lawn mower.

When it is desired to use the device of the present invention for loosening the soil, the handle of the lawn mower is angularly moved on the pivots 31 of its attaching bracket 32 from its normal position to a rearward or reverse position. The handle is limited in the extent of its angular pivoting by conventional stops 33 carried in the framework of the lawn mower. This pivoting of the handle reverses the position of the device 1 from above the handle of the lawn mower to a position below the handle.

The handle is then angularly tilted downward to bring the prongs of the device into contact with the ground and to carry the cutting head 15 of the lawn mower to an upside down position above the device.

In the operation of the combined device and lawn mower, the latter is pushed forwardly, whereupon the disc elements are caused to rotate and roll over the ground, digging into the bed soil as they do so. The superimposed weight of the lawn mower head tends to help sink the prongs of the rotating discs into the ground.

The angle of the force or pressure, exerted upon the revolving discs so as to cause them to dig more or less deeper into the ground, can be regulated by adjusting the angular position of the device 1 relative to the cutting head 15 of the lawn mower. This can be done by loosening the brackets 21 and clamp 22 slightly so as to enable the handle clamp to be moved to a position higher up or lower down on the handle. The brackets and clamp are then tightened to secure the device in its adjusted position. By this arrangement it is clear that the weight of the lawn mower, superimposed above the device 1, can be shifted angularly as desired. It is clear that when the weight of the mower head is shifted angularly forwardly of the perpendicular position relative to the device 1 that the angular disposition of its weight will tend to sink the prongs of the discs deeper into the ground, while rearward disposition of the weight will exert a lighter pressure upon the discs.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only in the form shown and described, but also in all such forms and modifications thereof as may reasonably be construed to be within the spirit of the invention and the scope of the appended claims.

What is claimed is:

1. In a soil conditioning device of the character described attachable as an accessory to the handle and tie rod of a hand lawn mower having a cutting head, an elongated cylindrical shaft having reduced threaded end extensions and shoulder formations at the points of beginning of the end extensions; an elongated rigid bar member having a loop at one end, a U-bolt clamp pivoted in the loop and engageable about the upper surface of the handle so as to position the loop of the bar member in abutment with the upper surface of the handle, and further having an eye-piece transversely of the opposite end pivoted centrally of the shaft; a plurality of pronged flat disc members having laterally extended hub portions rotatably disposed along the shaft at opposite sides of the eye-piece of the bar member; a pair of bracket members disposed at opposite ends of the shaft, each bracket member being characterized by a rigid bar having a clamp arrangement at its lower end for rigid attachment to the tie rod and having a bifurcation at its opposite end in which one of the reduced ends of the shaft is received; a nut element threaded upon each reduced end of the shaft so as to draw the bifurcated end of the related bracket rigidly against the adjacent end shoulder of the shaft; and the rigid bars of the brackets being of sufficient length so as to maintain the shaft in a position parallel to the tie rod wherein the pronged members are clear of the cutting head of the lawn mower.

2. In a soil conditioning device as defined in claim 1, wherein the rigid bar of a bracket member is flat and twisted in its mid area so that the bifurcated end is disposed in a plane at right angles to the clamp arrangement at the opposite end.

3. In a soil conditioning device as defined in claim 2, wherein the clamp arrangement at the end of the bracket bar is characterized by a lateral semicircular groove in the marginal end portion of the bar, a short separate bar element having a complementary semicircular groove, and bolt and nut means for securing the short separate bar element to the said marginal end portion of the bracket bar.

4. In a soil conditioning device as defined in claim 1, wherein the pronged disc members disposed immediately at opposite sides of the eye-piece are spaced from the latter by their hub portions, wherein the remaining pronged disc members are spaced from the latter pronged members and from each other by their hub portions and spacer elements, and wherein the shaft, upon removing the end nut elements is slidably removable from the several elements disposed thereon.

References Cited in the file of this patent

UNITED STATES PATENTS

| | | |
|---|---|---|
| 2,158,580 | Houser | May 16, 1939 |
| 2,231,821 | Sprouse | Feb. 11, 1941 |